United States Patent
Zhao et al.

(10) Patent No.: US 11,280,703 B2
(45) Date of Patent: Mar. 22, 2022

(54) VEHICLE-MOUNTED MOTION SIMULATION PLATFORM BASED ON ACTIVE SUSPENSION, AND CONTROL METHOD THEREOF

(71) Applicant: Yanshan University, Qinhuangdao (CN)

(72) Inventors: Dingxuan Zhao, Qinhuangdao (CN); Shuang Liu, Qinhuangdao (CN); Mingde Gong, Qinhuangdao (CN); Zhiguo Sun, Qinhuangdao (CN); Zhuxin Zhang, Qinhuangdao (CN); Tao Ni, Qinhuangdao (CN); Bin Yang, Qinhuangdao (CN); Qinghe Guo, Qinhuangdao (CN); Mengke Yang, Qinhuangdao (CN)

(73) Assignee: YANSHAN UNIVERSITY, Qinhuangdao (CN)

( * ) Notice: Subject to any disclaimer, the term of this patent is extended or adjusted under 35 U.S.C. 154(b) by 0 days.

(21) Appl. No.: 16/971,328

(22) PCT Filed: Aug. 1, 2019

(86) PCT No.: PCT/CN2019/098904
§ 371 (c)(1),
(2) Date: Aug. 20, 2020

(87) PCT Pub. No.: WO2020/052365
PCT Pub. Date: Mar. 19, 2020

(65) Prior Publication Data
US 2020/0393330 A1     Dec. 17, 2020

(30) Foreign Application Priority Data

Sep. 10, 2018 (CN) .......................... 201811051382.5
Aug. 1, 2019 (CN) .......................... 201910708295.0

(51) Int. Cl.
*G01M 17/04*     (2006.01)
*B60G 17/015*    (2006.01)
(Continued)

(52) U.S. Cl.
CPC ........... *G01M 17/04* (2013.01); *B60G 17/018* (2013.01); *B60G 17/0152* (2013.01);
(Continued)

(58) Field of Classification Search
None
See application file for complete search history.

(56) References Cited

U.S. PATENT DOCUMENTS

2018/0162186 A1* 6/2018 Anderson .............. B60K 35/00

FOREIGN PATENT DOCUMENTS

| CN | 107576517 A | 1/2018 |
|---|---|---|
| CN | 108382473 A | 8/2018 |

(Continued)

*Primary Examiner* — Eric S. McCall
*Assistant Examiner* — Timothy P Graves
(74) *Attorney, Agent, or Firm* — IPRO, PLLC

(57) ABSTRACT

A vehicle-mounted motion simulation platform based on active suspension and a control method thereof is provided. The vehicle-mounted motion simulation platform includes a vehicle body, a motion simulation platform fixedly connected to the vehicle body, an upper computer for posture control, a gyroscope, a plurality of wheels, and suspension servo actuating cylinders and displacement sensors corresponding to the wheels respectively, an electronic control unit, and a servo controller group. The electronic control unit calculates posture control parameters based on the posture instructions of the motion simulation platform input by the upper computer for posture control and posture information of the motion simulation platform measured by the gyroscope, and then outputs the posture control parameters to the servo controller group. The servo controller group controls
(Continued)

extension of the respective suspension servo actuating cylinders according to the posture control parameters to realize follow-up control over the posture of the motion simulation platform.

2 Claims, 5 Drawing Sheets

(51) Int. Cl.
- *B60G 17/016* (2006.01)
- *B60G 17/018* (2006.01)
- *B60G 17/0195* (2006.01)

(52) U.S. Cl.
CPC ..... *B60G 17/0161* (2013.01); *B60G 17/0195* (2013.01); *B60G 17/015* (2013.01); *B60G 2202/413* (2013.01); *B60G 2204/62* (2013.01); *B60G 2400/0511* (2013.01); *B60G 2400/0512* (2013.01); *B60G 2400/252* (2013.01); *B60G 2500/30* (2013.01); *B60G 2600/182* (2013.01); *B60G 2600/602* (2013.01); *B60G 2800/01* (2013.01)

(56) References Cited

FOREIGN PATENT DOCUMENTS

| | | | | |
|---|---|---|---|---|
| CN | 108501650 A | 9/2018 | | |
| CN | 109109601 A | 1/2019 | | |
| JP | 2014008454 A | 1/2014 | | |
| WO | WO-2006015592 A1 * | 2/2006 | ............. | G09B 9/042 |

* cited by examiner

VEHICLE-MOUNTED MOTION SIMULATION PLATFORM BASED ON ACTIVE SUSPENSION, AND CONTROL METHOD THEREOF

TECHNICAL FIELD

The present disclosure relates to the technical field of motion control, in particular to a vehicle-mounted motion simulation platform based on active suspension and a control method thereof.

BACKGROUND

A motion simulation platform is widely used in flight simulation, vehicle road simulation, navigation equipment swing simulation and entertainment facilities. It generally consists of a base, a motion platform and a driving mechanism connecting the base with the motion platform. Since a simulation cabin loaded on the motion simulation platform is generally heavy, the motion simulation platform has a risk of tipping over due to great inertia as moving, the base is commonly fixed on the ground and is difficult to move after fixed installation. Actually, some motion simulation facilities, the entertainment facilities and the like are required to be movable at times, for example, some motion simulation facilities for military training usually are moved with requirement for displacement of a resident, and some motion simulation facilities for entertainment are moved with requirement for gathering; however it is difficult for the motion simulation platform in the prior art to be movable as desired.

SUMMARY

The present disclosure provides a vehicle-mounted motion simulation platform based on active suspension and a control method thereof. The vehicle and the motion simulation platform are integrated as a whole to permit the movement of the motion simulation platform along with the vehicle, so as to achieve simulation for three freedom degrees of pitching, cambering and lifting on an uneven ground.

In order to solve the above mentioned technical problem, the technical solution as adopted by the present disclosed is described as follows:

A vehicle-mounted motion simulation platform based on active suspension includes a vehicle body, a motion simulation platform fixedly connected to the vehicle body, an upper computer for posture control, a gyroscope, an electronic control unit, a servo controller group, a plurality of wheels, suspension servo actuating cylinders respectively corresponding to the wheels one by one, and displacement sensors respectively corresponding to the wheels one by one; wherein the gyroscope is fixed on the motion simulation platform; the electronic control unit and the servo controller group are fixed on the vehicle body; the wheels are connected to a lower part of the vehicle body by the suspension servo actuating cylinders; the displacement sensors are used to measure stroke of the suspension servo actuating cylinders; the electronic control unit is in communication with the gyroscope and the servo controller group, respectively; the servo controller group is in communication with the displacement sensor; the electronic control unit calculates posture control parameters based on instructions of a platform posture input by the upper computer and information of the platform posture measured by the gyroscope, and then outputs the posture control parameters to the servo controller group; the servo controller group controls extension of the suspension servo actuating cylinders according to the posture control parameters to realize follow-up control of the platform posture.

A control method for the vehicle-mounted motion simulation platform based on active suspension includes processes of:

1) establishing a coordinate system OXYZ fixedly connected to the vehicle body, taking any point fixedly connected to the vehicle body as a coordinate origin O, defining a direction passing through the coordinate origin O and perpendicular to a plane on which the motion simulation platform is located as a Z-axis positive direction, defining a front direction in which the vehicle moves as a Y-axis positive direction, defining a right-side direction in which the vehicle moves as a X-axis positive direction, defining a lifting displacement of the motion simulation platform in the Z-axis direction as w, defining a rotation angle (i.e., pitch angle) around the X axis as $\alpha$, and defining a rotation angle (i.e., camber angle) around the Y axis as $\beta$;

2) measuring an initial slope of the vehicle-mounted motion simulation platform, controlling the suspension servo actuating cylinders of the vehicle to extend to an intermediate position of the stroke before starting the motion simulation, and measuring the pitch angle $\alpha_0$ and the camber angle $\beta_0$ of the motion simulation platform by the gyroscope, and then outputting the pitch angle $\alpha_0$ and the camber angle $\beta_0$ to the electronic control unit for use in motion simulation;

3) performing the motion simulation, and setting scanning periods in a control program of the electronic control unit, wherein in each of the scanning periods, the electronic control unit receives the posture instructions, which include a pitch angle$\alpha$1, a camber angle$\beta$1, the lifting displacement w1 and the values $\alpha_0$, $\beta_0$ obtained through the process 2), transmitted from the upper computer; and $\alpha_1$-$\alpha_0$, $\beta_1$-$\beta$ and w1 are taken as relative posture target values; the target values of the extension of each of the suspension servo actuating cylinders is calculated through an inverse kinematics algorithm of a vehicle suspension mechanism, and the target values are transmitted to the servo controller group to perform displacement servo control of each of the suspension servo actuating cylinders, such that simulation of a predetermined motion is realized by the motion simulation platform.

According to one of the embodiments of the present disclosure, the coordinate origin O is taken at a centroid of the vehicle body.

According to the present disclosure, the vehicle and the motion simulation platform are integrated, a wheel suspension mechanism is used as a servo actuator of the motion simulation platform, and the posture of the vehicle body may be controlled depending on different slopes. Such motion simulation platform may be movable along with the vehicle, and may be parked on the uneven ground or grounds with a certain slope. The motion simulation platform according to the present disclosure has a wide application prospect, since it can overcome a disadvantage that the existing motion simulation platform is inconvenient to move, so as to meet the requirements that some motion simulation facilities for military training are movable with requirement of the displacement of the resident, and some motion simulation facilities for civil entertainments are movable with requirement of gathering.

DETAILED DESCRIPTION

Hereinafter, the present disclosure will be further described in detail with reference to the following embodiments.

The present disclosure provides a vehicle-mounted motion simulation platform based on active suspension and a control method thereof. The vehicle and the motion simulation platform are integrated as a whole, and a wheel suspension mechanism is used as a servo actuator of the motion simulation platform, so as to simulate three freedom degrees of pitching, cambering and lifting.

As an example of the conventional three-wheel vehicles and four-wheel vehicles, a method for establishing a mobile motion simulation platform and a method for controlling the mobile motion simulation platform on an uneven road with a slop will be described below. The establishing method and the control method of other mobile motion simulation platforms with more than three wheels can be realized according to the same principle as above mentioned.

According to the first embodiment, a three-wheel mobile motion simulation platform based on active suspension and a control method thereof are provided.

Figure 1:
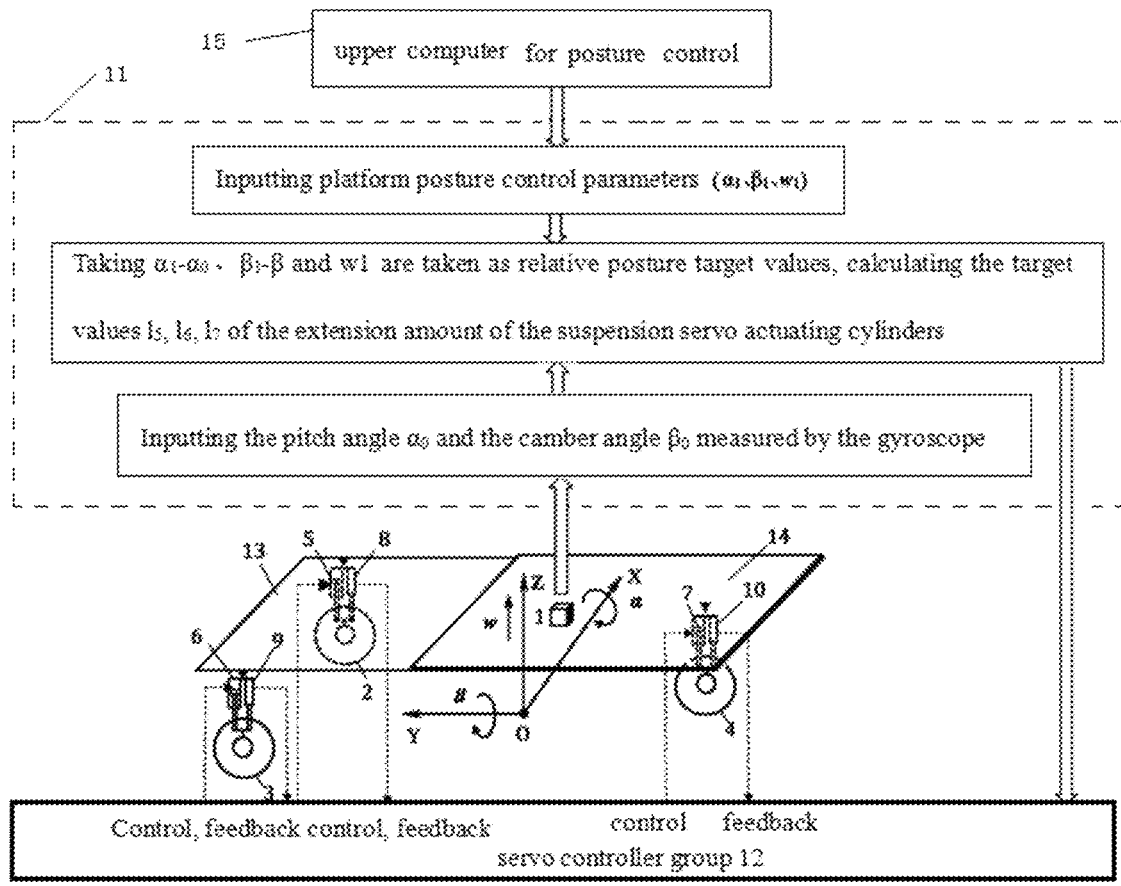
FIG. 1 is a structural schematic view of a vehicle-mounted motion simulation platform based on active suspension and a control system thereof.

As shown in FIG. 1, the system includes a vehicle body 13, a motion simulation platform 14 fixedly connected to the vehicle body 13, an upper computer 15 for posture control, a gyroscope 1, wheels 2, 3 and 4, suspension servo actuating cylinders 5, 6 and 7 respectively corresponding to the wheels 2, 3 and 4 one by one, and displacement sensors 8, 9 and 10 respectively corresponding to the wheels 2, 3 and 4 one by one, an electronic control unit 11 and a servo controller group 12. The gyroscope 1 is fixed on the motion simulation platform 14. The wheels 2, 3, and 4 are respectively connected to a lower part of vehicle body 13 through the suspension servo cylinders 5, 6, and 7. The displacement sensors 8, 9, and 10 are used to measure stroke of the suspension servo cylinders 5, 6, and 7, respectively. The electronic control unit 11 and the servo controller group 12 are fixed on vehicle body 13. The electronic control unit 11 is in communication with the gyroscope 1 and the servo controller group 12. The servo controller group 12 is in communication with the displacement sensors 8, 9 and 10.

The electronic control unit 11 calculates posture control parameters based on posture instructions of the motion simulation platform 14 input by the upper computer 15 for posture control and posture information of the motion simulation platform measured by the gyroscope 1, and then outputs the posture control parameters to the servo controller group 12. The servo controller group 12 controls extension of the suspension servo actuating cylinders 5, 6 and 7 according to the posture control parameters so as to realize follow-up control of the posture of the motion simulation platform 14.

According to the three-wheel vehicle of this embodiment, the wheels and the suspended servo actuating cylinders can form supporting points for the vehicle body, so that the posture of the vehicle body may be controlled on the basis that a plane is determined by three points.

The control method of this embodiment includes following steps:

1) Establishing A Coordinate System

The established coordinate system OXYZ is fixedly connected to the vehicle body. The coordinate origin O is taken at a centroid of the vehicle body 13 (or at any point fixedly connected to the vehicle body). A direction passing through the coordinate origin O and perpendicular to a plane on which the motion simulation platform is located is defined as a Z-axis positive direction. A front direction in which the vehicle moves is defined as a Y-axis positive direction. A right-side direction in which the vehicle moves is defined as a X-axis positive direction. A lifting displacement of the motion simulation platform in the Z-axis direction is defined as w. A rotation angle (i.e., pitch angle) around the X axis is defined as $\alpha$. And a rotation angle (i.e., camber angle) around the Y axis is defined as $\beta$.

2) Control Process of the Motion Simulation

The first step is to measure an initial slope of the vehicle-mounted motion simulation platform. Since the slope of the uneven road on which the mobile motion simulation platform is parked cannot be changed during work, it is required to measure the pitch angle $\alpha_0$ and the camber angle $\beta_0$ by gyroscope once. Prior to starting the motion simulation, the extension of three wheel suspension servo actuating cylinders are controlled to reach half way, that is, to reach an intermediate position of the stroke, and the pitch angle $\alpha_0$ and the camber angle $\beta_0$ of the motion simulation platform are measured by gyroscope and then are output to the electronic control unit for use in the motion simulation.

The second step is to perform the motion simulation. Scanning periods are set in a control program of the electronic control unit 11. In each of the scanning periods, the electronic control unit receives the posture instructions, which include a pitch angle$\alpha 1$, a camber angle$\beta 1$, the lifting displacement w1 and the values $\alpha_0$, $\beta_0$ obtained through the previous process, transmitted from the upper computer, and $\alpha_1 - \alpha_0$, $\beta_1 - \beta$ and w1 are taken as relative posture target values. Target values $l_5$, $l_6$, $l_7$ of the extension amount of each of the suspension servo actuating cylinders 5, 6, 7 are calculated, and are transmitted to the servo controller group 12 to perform displacement servo control for each of the suspension servo actuating cylinders 5, 6, 7, such that the simulation of the predetermined motion can be realized by the motion simulation platform. The target values of the extension amount of each of the suspension servo actuating cylinders are calculated through an inverse kinematics algorithm of the vehicle suspension mechanism. When the servo controller group performs displacement control of each of the suspension servo actuating cylinders, the extension of the suspension servo actuating cylinders can be controlled according to the target values of the stroke and the extension amount of the suspension servo actuating cylinders measured by the displacement sensors.

Such situation that the mobile motion simulation platform parks on a flat ground for working is the commonly seen situation. As working on the flat ground is a special case of working on an uneven ground, the afore-mentioned control method certainly can be used.

According to the second embodiment, a four-wheel mobile motion simulation platform based on active suspension and control method thereof are provided.

Figure 2:
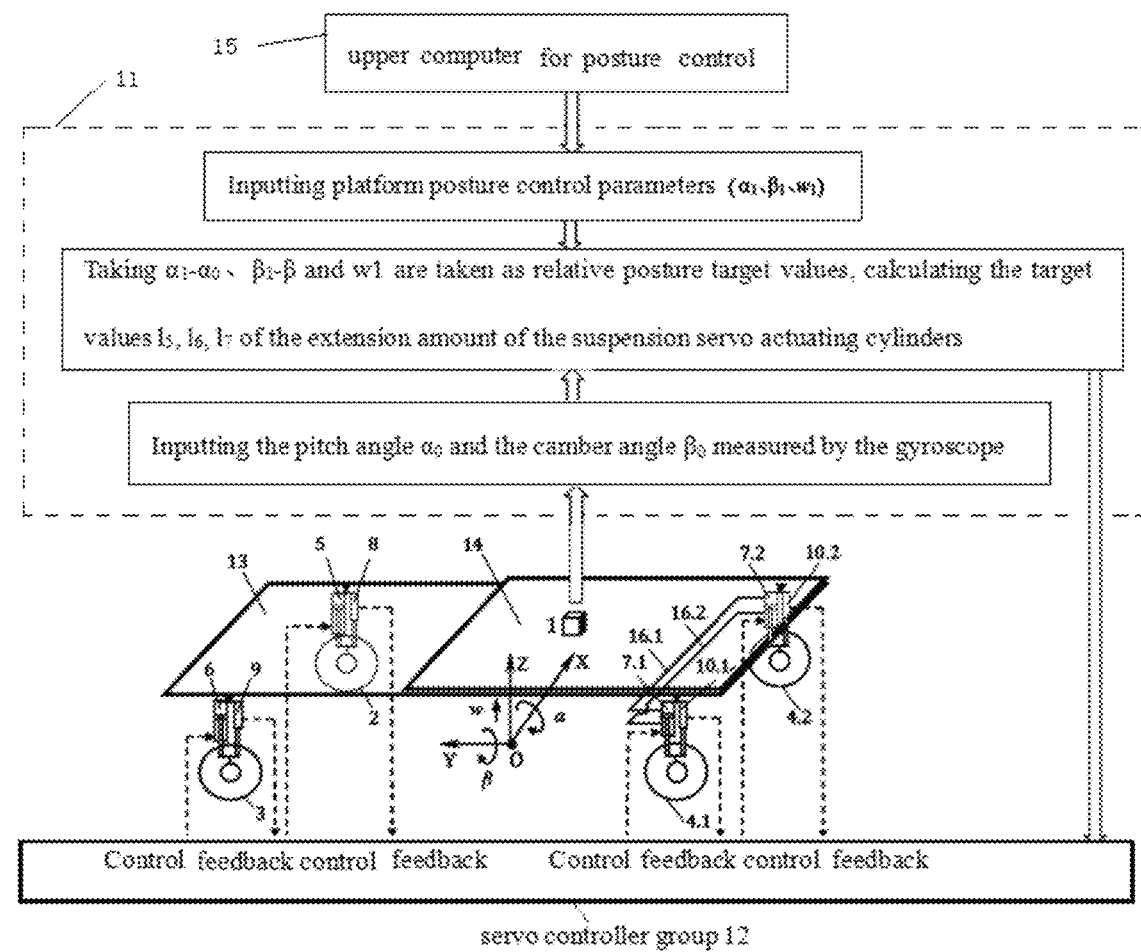
FIG. 2 is a structural schematic view of a four-wheel mobile motion simulation platform based on active suspension and a control system thereof.

As shown in FIG. 2, the system includes a vehicle body 13, a motion simulation platform 14 fixedly connected to the vehicle body 13, an upper computer 15 for posture control, a gyroscope 1, wheels 2, 3, 4.1 and 4.2, suspension servo actuating cylinders 5, 6, 7.1 and 7.2 respectively corresponding to the wheels 2, 3, 4.1 and 4.2 one by one, and displacement sensors 8, 9, 10.1 and 10.2 respectively corresponding to the wheels 2, 3, 4.1 and 4.2 one by one, an electronic control unit 11 and a servo controller group 12. The gyroscope 1 is fixed on the motion simulation platform 14. The wheels 2, 3, 4.1 and 4.2 are respectively connected to a lower part of vehicle body 13 through the suspension servo cylinders 5, 6, 7.1 and 7.2. The displacement sensors 8, 9, 10.1 and 10.2 are used to measure stroke of the suspension servo cylinders 5, 6, 7.1 and 7.2, respectively. The electronic control unit 11 and the servo controller group 12 are fixed on vehicle body 13. The electronic control unit 11 is in communication with the gyroscope 1 and the servo controller group 12. The servo controller group 12 is in communication with the displacement sensors 8, 9, 10.1 and 10.2.

As an example of the four-wheel vehicle in this embodiment, in order to control the posture of the vehicle, the wheels 4.1 and 4.2 are considered as an equivalent supporting point, that is, upper chambers and lower chambers of the suspension servo actuating cylinders 7.1 and 7.2 corresponding to the wheels 4.1 and 4.2 are individually communicated; that is, the upper chambers of the suspension servo actuating cylinders 7.1 and 7.2 are connected with each other through an upper chamber connecting pipeline 16.1; the lower chambers of the suspension servo actuating cylinders 7.1 and 7.2 are connected with each other through a lower chamber connecting pipeline 16.2. Function of the wheels 4.1 and 4.2 and the suspension servo actuating cylinders thereof supporting the vehicle body is equivalent to that of the supporting point, while the other two wheels 2 and 3 and the suspension servo actuating cylinders thereof respectively form supporting points for the vehicle body 13. As for the conventional vehicle, two rear wheels and the suspension servo actuating cylinders thereof have the same structure, so that the equivalent supporting point is considered as a midpoint of an upper hinge point on the suspension servo actuating cylinders 7.1 and 7.2 corresponding to the wheels 4.1 and 4.2. The height of the equivalent supporting point is controlled by controlling an average value (shown by $1_7$ in FIG. 2) of the extension of the suspension servo actuating cylinders 7.1 and 7.2. Subsequently, the control method of this embodiment is exactly the same as that of the first embodiment, which will be omitted herein.

When the number of the wheels is greater than 4, the number of the wheels in a wheel group may be one or more. One wheel group forms a supporting point for supporting the vehicle body, and three wheel groups form three supporting points which can determine a plane, according to which principle, the posture of the vehicle body is controlled. The supporting point of each of the wheel groups for supporting the vehicle body is a geometric center point of the supporting point of each of the suspension servo actuating cylinders for supporting the vehicle body. The height of the supporting point is controlled by controlling the average extension amount of the suspension servo actuating cylinders in the wheel group. The present disclosure provides the control method for the vehicle-mounted motion simulation platform with more than three wheels, which may be converted into three wheel groups, thereby expanding a range of the control method in the field of vehicle-mounted motion simulation platform control. The wheel group is formed by the wheels close to one another, in order to communication between the upper and lower chambers of the suspension servo actuating cylinders in the wheel group.

In order to better show that the simulation of predetermined motion can be realized by the vehicle-mounted motion simulation platform based on active suspension, sinusoidal pitching motion simulation, sinusoidal cambering motion simulation and sinusoidal lifting motion simulation are performed by the vehicle-mounted motion simulation platform based on active suspension according to the present disclosure.

Figure 3:
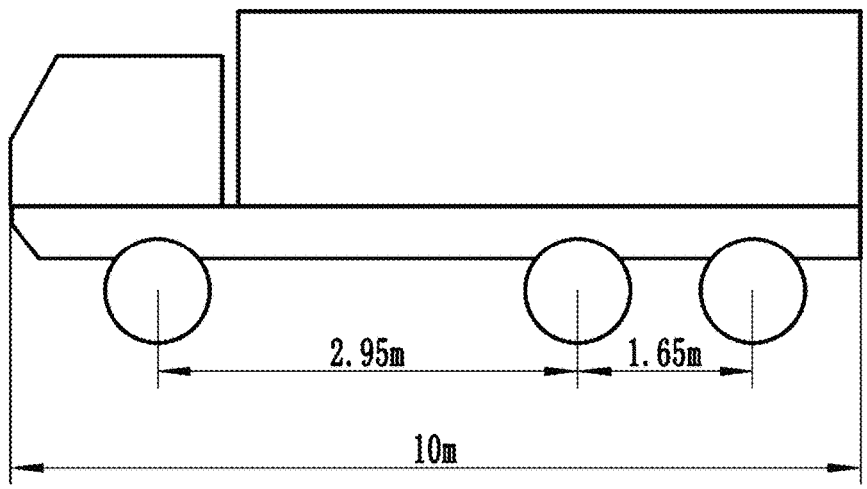
FIG. 3 is a schematic view of a three-shaft vehicle in a test.

As shown in FIG. 3, the three-shaft vehicle motion simulation platform based on active suspension has a length of 10 m, a wheelbase of (2.95+1.65)m, an overall weight of 36 t, an shaft load of 12 t and a suspension stroke of ±0.11 m. In the test, the upper chambers of the suspension servo actuating cylinders corresponding to the two front wheels of the three-shaft six-wheel vehicle are in communication through connecting pipelines, and the lower chambers of the suspension servo actuating cylinders corresponding to the two front wheels of the three-shaft six-wheel vehicle are in communication through connecting pipelines, such that the function of the front wheels and the suspensions supporting the vehicle body is equivalent to that of one supporting point; the upper chambers and the lower chambers of the suspension servo actuating cylinders corresponding to the two wheels on the right side of the two shafts on the rear of the vehicle are respectively in communication through connecting pipelines, such that the function of the two wheels on the right rear side supporting the vehicle body is equivalent to that of one supporting point; the upper chambers and the lower chambers of the suspension servo actuating cylinders corresponding to the two wheels on the left sides of the two shafts on the rear of the vehicle are respectively in communication through connecting pipelines, such that the function of the two wheels on the left rear side supporting the vehicle body is equivalent to that of one supporting point. In this way, the vehicle body totally has three supporting points. The four wheels and the suspension servo actuating cylinders at the rear of the vehicle have the same structure.

Figure 4:
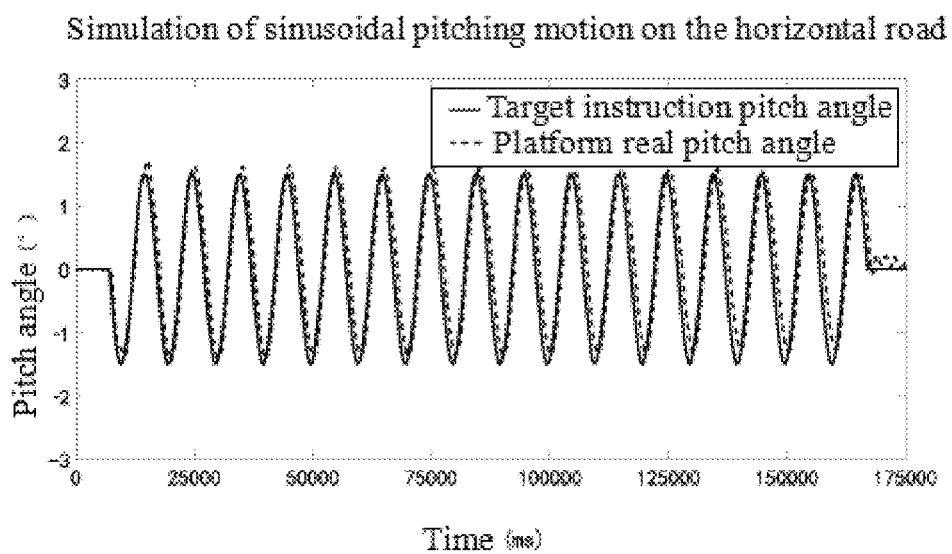
FIG. 4 is a curve graph showing comparison between a real pitch angle and an instruction pitch angle of the platform measured when pitching motion is simulated by the three-shaft vehicle-mounted motion simulation platform.
Figure 5:
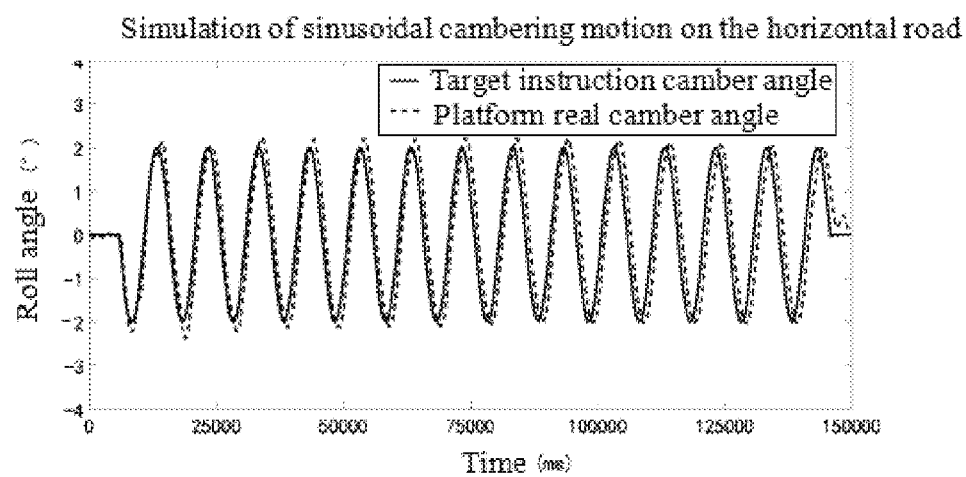
FIG. 5 is a curve graph showing comparison between a real camber angle and an instruction camber angle of the platform measured when a cambering motion is simulated by the three-shaft vehicle-mounted motion simulation platform.
Figure 6:
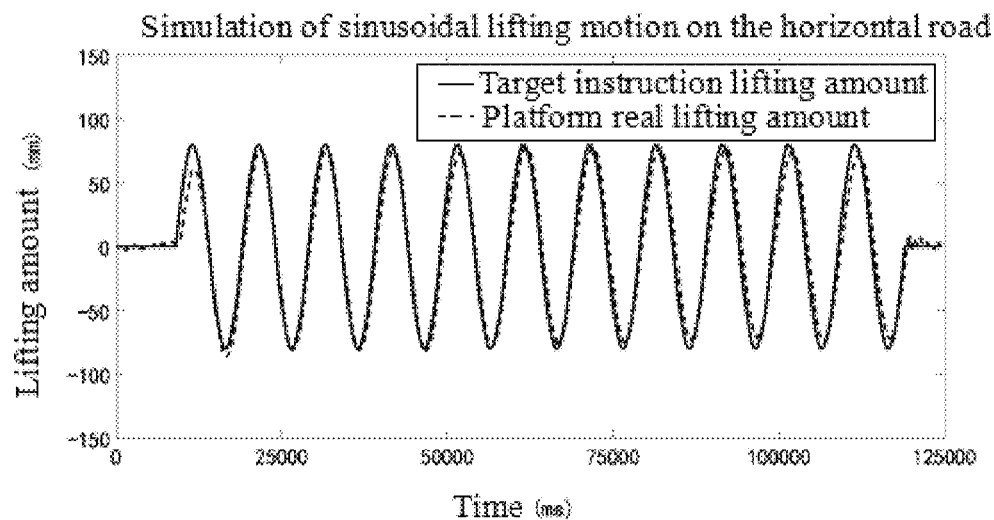
FIG. 6 is a curve graph showing comparison between a real lifting amount and an instruction lifting amount of the platform measured when a lifting motion is simulated by the three-shaft vehicle-mounted motion simulation platform.

FIG. 4 is a curve graph showing comparison between a real pitch angle and an instruction pitch angle of the platform when pitching motion is simulated by the three-shaft vehicle-mounted motion simulation platform as parking on a horizontal road. FIG. 5 is a curve graph showing comparison between a real camber angle and an instruction camber angle of the platform when a cambering motion is simulated by the three-shaft vehicle-mounted motion simulation platform as parking on the horizontal road. FIG. 6 is a curve graph showing comparison between a real lifting amount and an instruction lifting amount of the platform when a lifting motion is simulated by the three-shaft vehicle-mounted motion simulation platform. As can be seen from FIG. 4, FIG. 5 and FIG. 6, the real pitch angle, the real camber angle and the real lifting amount of the three-shaft vehicle-mounted motion simulation platform based on active suspension parking on the horizontal road and simulating the pitching motion, the cambering motion and the lifting motion are substantially consistent with the instruction pitch angle, the instruction camber angle and the instruction lifting amount output by the upper computer for posture control, except for few time lapse.

Figure 7:
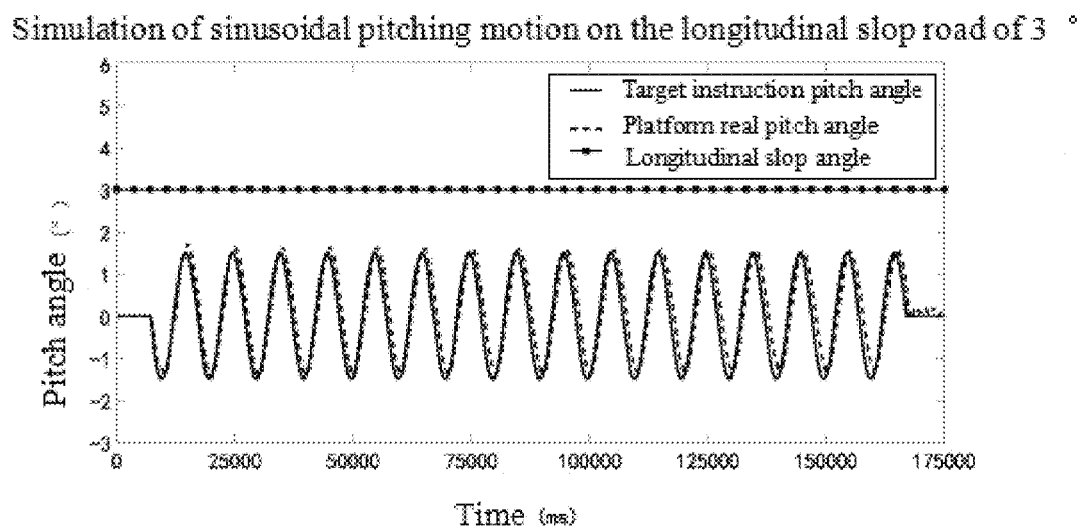
FIG. 7 is a curve graph showing comparison between a real pitch angle and an instruction pitch angle of the platform measured when the pitching motion is simulated by the three-shaft vehicle-mounted motion simulation platform on a longitudinal slope road of 3°.
Figure 8:
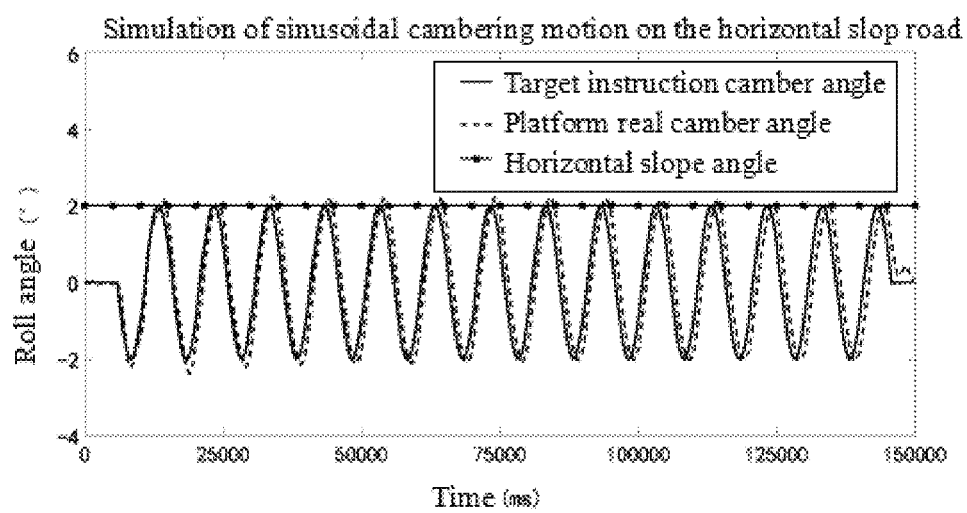
FIG. 8 is a curve graph showing comparison between a real camber angle and an instruction camber angle of the platform measured when the cambering motion is simulated by the three-shaft vehicle-mounted motion simulation platform on a horizontal slope road of 2°.

FIG. 7 is a curve graph showing comparison between a real pitch angle and an instruction pitch angle of the platform when the pitching motion is simulated by the three-shaft vehicle-mounted motion simulation platform parking on a longitudinal slope road of 3°. FIG. 8 is a curve graph showing comparison between a real camber angle and an instruction camber angle of the platform when the cambering motion is simulated by the three-shaft vehicle-mounted motion simulation platform parking on a horizontal slope road of 2°.

As can be seen from FIG. 7 and FIG. 8, the real pitch angle and the real camber angle of the three-shaft vehicle-mounted motion simulation platform based on active suspension parking on the horizontal road and simulating the pitching motion and the cambering motion are substantially consistent with the instruction pitch angle and the instruction camber angle output by the upper computer for posture control, except for few time lapse.

Effective simulation of various motions can be achieved by the vehicle-mounted motion simulation platform based on active suspension, no matter whether it parks on the horizontal road or not.

Finally, it should be noted that the above-mentioned embodiments are only used to illustrate the technical solution of the present disclosure, rather than limit the present disclosure. Although the present disclosure has been described in detail with reference to the foregoing embodiments, it should be understood by the person skilled in the art that it is allowable to modify the technical solution described in the foregoing embodiments or equivalently substituting some or all of the technical features; however, these modifications or substitutions do not cause the corresponding technical solutions to substantively depart from the scope of the technical solutions of various embodiments of the present disclosure.

What is claimed is:

1. A control method for the vehicle-mounted motion simulation platform based on active suspension, comprising processes of:
 1) establishing a coordinate system OXYZ fixedly connected to the vehicle body, taking any point fixedly connected to the vehicle body as a coordinate origin O, defining a direction passing through the coordinate origin O and perpendicular to a plane on which the motion simulation platform is located as a Z-axis positive direction, defining a front direction in which the vehicle moves as a Y-axis positive direction, defining a right-side direction in which the vehicle moves as a X-axis positive direction, defining a lifting displacement of the motion simulation platform in the Z-axis direction as w, defining a rotation angle around the X axis as $\alpha$, and defining a rotation angle around the Y axis as $\beta$;
 2) measuring an initial slope of the vehicle-mounted motion simulation platform, controlling the suspension servo actuating cylinders of the vehicle to extend to an intermediate position of the stroke before starting the motion simulation, and measuring a pitch angle $\alpha_0$ and a camber angle $\beta_0$ of the motion simulation platform by the gyroscope, and then outputting the pitch angle $\alpha_0$ and the camber angle $\beta_0$ to the electronic control unit for use in motion simulation;
 3) performing the motion simulation, and setting scanning periods in a control program of the electronic control unit, wherein in each of the scanning periods, the electronic control unit receives the posture instructions, which include a pitch angle $\alpha_1$, a camber angle $\beta_1$, a lifting displacement $w_1$ and the values $\alpha_0$, $\beta_0$ obtained through the process 2), transmitted from the upper computer; and $\alpha_1$-$\alpha_0$, $\beta_1$-$\beta_0$ and $w_1$ are taken as relative posture target values; the target values of the extension of each of the suspension servo actuating cylinders is calculated through an inverse kinematics algorithm of a vehicle suspension mechanism, and the target values are transmitted to the servo controller group to perform displacement servo control of each of the suspension servo actuating cylinders, such that simulation of a predetermined motion is realized by the motion simulation platform.

2. The control method of the vehicle-mounted motion simulation platform based on active suspension according to claim 1, wherein the coordinate origin is taken at a centroid of the vehicle body.

* * * * *